United States Patent [19]

Kinzenbaw et al.

[11] Patent Number: 5,108,249
[45] Date of Patent: Apr. 28, 1992

[54] GRAVITY FED, CHAIN CONVEYER FOR GRAIN CART

[75] Inventors: Jon E. Kinzenbaw, Williamsburg; Alan F. Barry, Fairfax, both of Iowa

[73] Assignee: Kinze Manufacturing, Inc., Williamsburg, Iowa

[21] Appl. No.: 556,348

[22] Filed: Jul. 23, 1990

[51] Int. Cl.⁵ .................................................. B60P 1/40
[52] U.S. Cl. ................................ 414/523; 414/519; 414/528
[58] Field of Search ............... 414/519, 520, 523, 528, 414/920; 198/311, 317, 813, 861.4

[56] References Cited

U.S. PATENT DOCUMENTS

| | | | |
|---|---|---|---|
| 1,582,783 | 4/1926 | Psenka | 414/519 |
| 2,466,923 | 4/1949 | Woodard | 414/519 |
| 2,609,115 | 9/1952 | Oklejas | 414/528 X |
| 2,772,767 | 12/1956 | Seifert | |
| 2,883,076 | 4/1959 | Palmer | |
| 2,991,895 | 7/1961 | Dietzenbach | 198/317 X |
| 3,171,558 | 3/1965 | Sharp | |
| 3,460,698 | 8/1969 | Harris | |
| 3,638,816 | 2/1972 | Mann | 414/523 X |
| 3,719,268 | 3/1973 | Koehnen | |
| 4,037,745 | 7/1977 | Hengen | 414/504 |
| 4,274,790 | 6/1981 | Barker | 414/502 |
| 4,284,192 | 8/1981 | Taylor | 198/813 |
| 4,411,581 | 10/1983 | Niewold | 414/489 |
| 4,427,105 | 1/1984 | Hawley et al. | 198/632 |
| 4,583,905 | 4/1986 | Scherr | 414/505 |
| 4,613,275 | 9/1986 | Karlowsky | 198/861.4 X |
| 4,742,938 | 5/1988 | Niewold | 414/523 X |
| 4,846,621 | 7/1989 | Warsaw | 414/526 |
| 4,878,802 | 11/1989 | Hansen et al. | 414/523 |
| 4,923,358 | 5/1990 | Van Mill | 414/520 X |

Primary Examiner—Robert J. Spar
Assistant Examiner—James Keenan
Attorney, Agent, or Firm—Emrich & Dithmar

[57] ABSTRACT

A two-wheeled grain cart adapted for pulling by a tractor includes a downwardly tapered lower hopper section with a discharge aperture and a hydraulically controlled, sliding access door. A conveyer having a first inlet end and a second discharge end is coupled to an outer side of the grain cart and is movable between a generally horizontal transport/storage position and an upright use position through the use of a hydraulic cylinder. When in the use position, the open inlet end of the conveyer is aligned with and disposed over the hopper discharge aperture for receiving grain under gravity feed and displacing the grain via a chain driven, paddle-type conveyer to its second discharge end for off-loading. A lower end of the conveyer is coupled via a sprocket drive arrangement to a shaft coupled to a tractor's power take-off (PTO) unit for driving the chain and paddle combination. A spring-loaded, jaw-type coupler engages as the conveyer is unfolded to the upright position to provide conveyor drive from the tractor's PTO unit. The conveyor's inlet end is wedged into tight-fitting engagement with the hopper adjacent the discharge aperture to prevent grain loss, while conveyor chain tension is maintained by hydraulic cylinders near its second discharge end. The conveyor is mounted to the grain cart via a hinge pin and includes a single elongated, rigid, unitary housing for grain transport and conveyor paddle return.

48 Claims, 9 Drawing Sheets

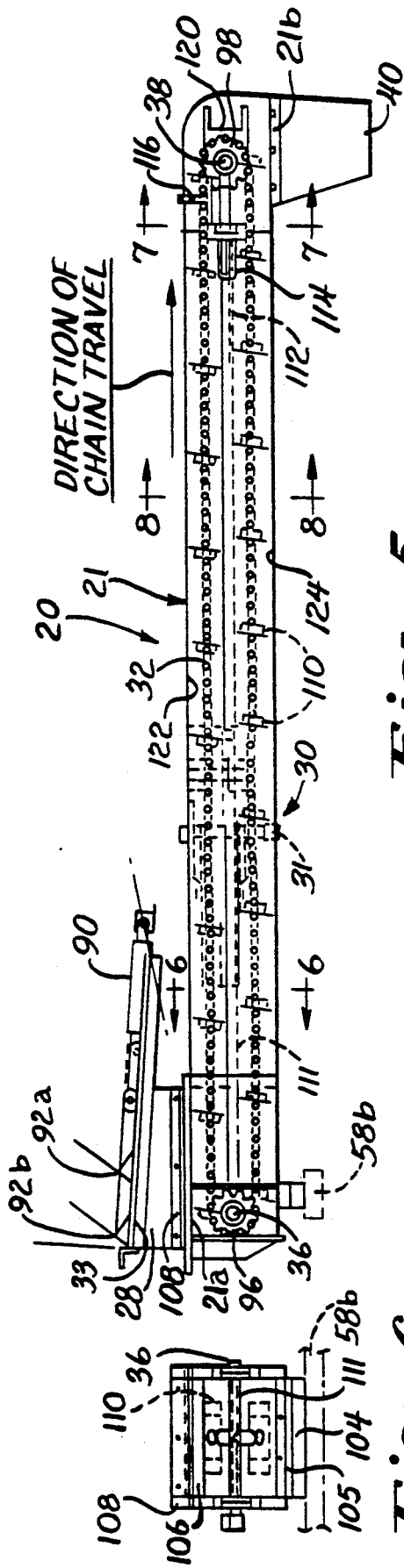
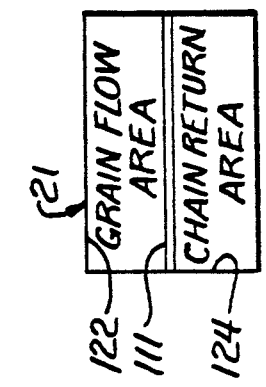

GRAVITY FED, CHAIN CONVEYER FOR GRAIN CART

BACKGROUND OF THE INVENTION

This invention relates generally to carts for the collection and transport of grain and is particularly directed to a conveyor for off-loading harvested grain from a tractor-pulled cart onto a truck or other vehicle for transport or storage.

A grain cart is used for the storage and transport of harvested grain. The grain cart is frequently loaded from a combine in the field while the grain cart is drawn by a tractor alongside the combine and receives the grain harvested by and discharged from the combine for later deposit in a truck for transport to a grain elevator. The grain cart generally includes a bin-type structure with wheels as well as a self-contained discharge unit for off-loading of the grain. The discharge unit is typically a multi-section auger which allows for transfer of grain stored in the cart to a truck as the cart is being pulled by a tractor. The auger is typically configurable between a folded, non-use position and an extended, use position.

Grain cart off-loading arrangements of the auger-type suffer from several operating limitations. A primary disadvantage of this type of grain discharge device is in damage to the grain caused by wedging of the grain between the rotating auger, or drill, and its outer housing. Damage to the grain in the form of cracking increases grain susceptibility to infestation by insects and generally degrades grain quality. In addition, grain cart augers typically operated by power derived from a tractor pulling the cart require a large power output from the tractor to move the grain. The high power operating requirement of auger-type off-loading mechanisms has necessitated use of complicated and heavy drive linkage arrangements between the tractor's power take-off (PTO) unit and the cart's off-loading unit.

Prior grain discharge arrangements have also generally involved positioning a lower portion of the conveyor housing, or chute, within the grain cart or attaching it to an outer portion of the cart housing. Positioning the off-loading chute within the cart reduces the grain holding capacity of the cart and prevents access to the off-loading mechanism when the cart is filled with grain.

The present invention addresses the aforementioned limitations of the prior art by providing a gravity fed, paddle-type chain conveyor for a grain cart which includes a single, unitary, elongated housing positioned outside of the cart which is pivotable between a generally horizontal storage/transport position and an upright use position. In the use position, a lower inlet end of the conveyor housing is disposed over an aperture in a tapered discharge chute in a lower portion of the cart for gravity feed of the grain to the conveyor where it is transported upward for discharge into a truck or other vehicle for transport or storage. The gravity fed, chain conveyor of the present invention requires reduced power to operate, reduces damage to the transported grain, is operable by a tractor operator from the tractor, and can be used to either discharge the grain directly into a pit disposed below the cart or into a truck, as described above.

OBJECTS AND SUMMARY OF THE INVENTION

Accordingly, it is an object of the present invention to provide an improved conveyor for off-loading grain from a cart.

It is another object of the present invention to provide a gravity-fed, chain conveyor for removing grain from a cart which is movable between an upright, use position and a generally horizontal, non-use position for transport or storage.

Yet another object of the present invention is to provide a paddle-type conveyor for removing grain from a tractor pulled cart which reduces grain damage during off-loading and requires less power from the tractor's PTO unit to operate.

A further object of the present invention is to provide a grain cart off-loading arrangement which allows for grain removal either by discharge through an apertured discharge chute directly into a pit under the grain cart or by a conveyor coupled to the discharge chute for off-loading the grain into a truck or other vehicle.

A still further object of the present invention is to provide a conveyor for a grain cart movable between an upright, use position and a generally horizontal, non-use position which employs a rigid, unitary housing for high strength and ease of manufacture, assembly and operation.

Another object of the present invention is to provide for automatic chain tensioning in a paddle-type, chain-driven conveyor.

Still another object of the present invention is to provide an improved folding mechanism for a conveyor on a grain cart which operates from a tractor's hydraulic system, positions the conveyor when upright in alignment with the cart's midline and supports the conveyor over a cart axle for improved strength and stability, and operates in conjunction with a discharge door to prevent accidental discharge and grain loss.

A further object of the present invention is to provide a gravity fed conveyor for removing grain from a cart which is positioned outside of the cart and is movable between a generally horizontal storage/transport position and an upright use position wherein a lower end of the conveyor is in sealed contact with the cart about a discharge aperture therein.

This invention contemplates a grain cart adapted for pulling by a tractor having a power take-off (PTO) unit, the grain cart comprising: a body having a plurality of side walls defining an open upper portion for receiving and holding grain and a lower, tapered hopper portion having a discharge aperture; a plurality of wheels coupled to the body to facilitate transport of the body; a conveyor having an elongated, unitary housing with an open inlet end and an open outlet end and a plurality of spaced movable paddles for transporting grain from the inlet end to the outlet end; a mounting arrangement for pivotally attaching the conveyor to an outer, lateral portion of the body; a positioning structure coupled to the mounting arrangement for pivotally displacing the conveyor between a generally horizontal non-use position and an upright position wherein grain enters the inlet end of the conveyor under the influence of gravity from the hopper discharge aperture; and a drive system coupled to the conveyor for transporting grain from the inlet end to the outlet end of the conveyor for discharge therefrom.

This invention also contemplates a folding mechanism for a conveyor on a grain cart for moving the conveyor between a non-use position for transport or storage and a use position for off-loading grain from the cart, wherein the conveyor includes an elongated housing and the cart includes a body having a lower chute with a discharge aperture therein, the folding mechanism comprising: an attachment mechanism for pivotally coupling an intermediate portion of the conveyor housing to the cart body and allowing the conveyor to move between a generally horizontal non-use position for storage or transport and an upright use position, wherein a lower open portion of the conveyor housing is aligned with the discharge aperture for receiving grain from the cart body under gravity for transport to and discharge from an upper open portion of the conveyor and wherein the housing is of unitary structure; and a displacement arrangement coupled to the attachment mechanism for pivotally moving the attachment mechanism and the conveyor housing attached thereto between the non-use and use positions.

This invention further contemplates a conveyor for off-loading grain from a cart including a body with a discharge aperture in a lower portion thereof, the conveyor comprising: an elongated, linear housing of unitary structure having open inlet and outlet apertures at respective ends thereof; a displacement mechanism disposed within the housing and including a plurality of spaced paddles for moving grain deposited in the inlet aperture to the outlet aperture of the housing for discharge therefrom; a positioning arrangement coupling the housing to the cart body for pivotally displacing the housing between a generally horizontal non-use position for storage or transport and an upright position for off-loading grain from the cart; and a drive assembly coupled to the displacement mechanism when the housing is in the upright position for displacing the paddles in moving and off-loading the grain, and wherein the displacement mechanism is disconnected from the drive assembly when the housing is moved to the non-use position.

BRIEF DESCRIPTION OF THE DRAWING

The appended claims set forth those novel features which characterize the invention. However, the invention itself, as well as further objects and advantages thereof, will be understood by reference to the following detailed description of a preferred embodiment taken in conjunction with the accompanying drawings, where like reference characters identify like elements throughout the various figures, in which:

FIG. 5 is a longitudinal sectional view of the paddle-type conveyor;

FIG. 6 is a sectional view of the paddle-type conveyor of FIG. 5 taken along site line 6—6 therein;

FIG. 7 is a sectional view of the paddle-type conveyor shown in FIG. 5 taken along site line 7—7 therein;

FIG. 8 is a simplified sectional view of the paddle-type conveyor of FIG. 5 taken along site line 8—8 therein illustrating the separation of the grain flow and chain return areas within the conveyor housing;

DESCRIPTION OF THE PREFERRED EMBODIMENT

Figure 1:
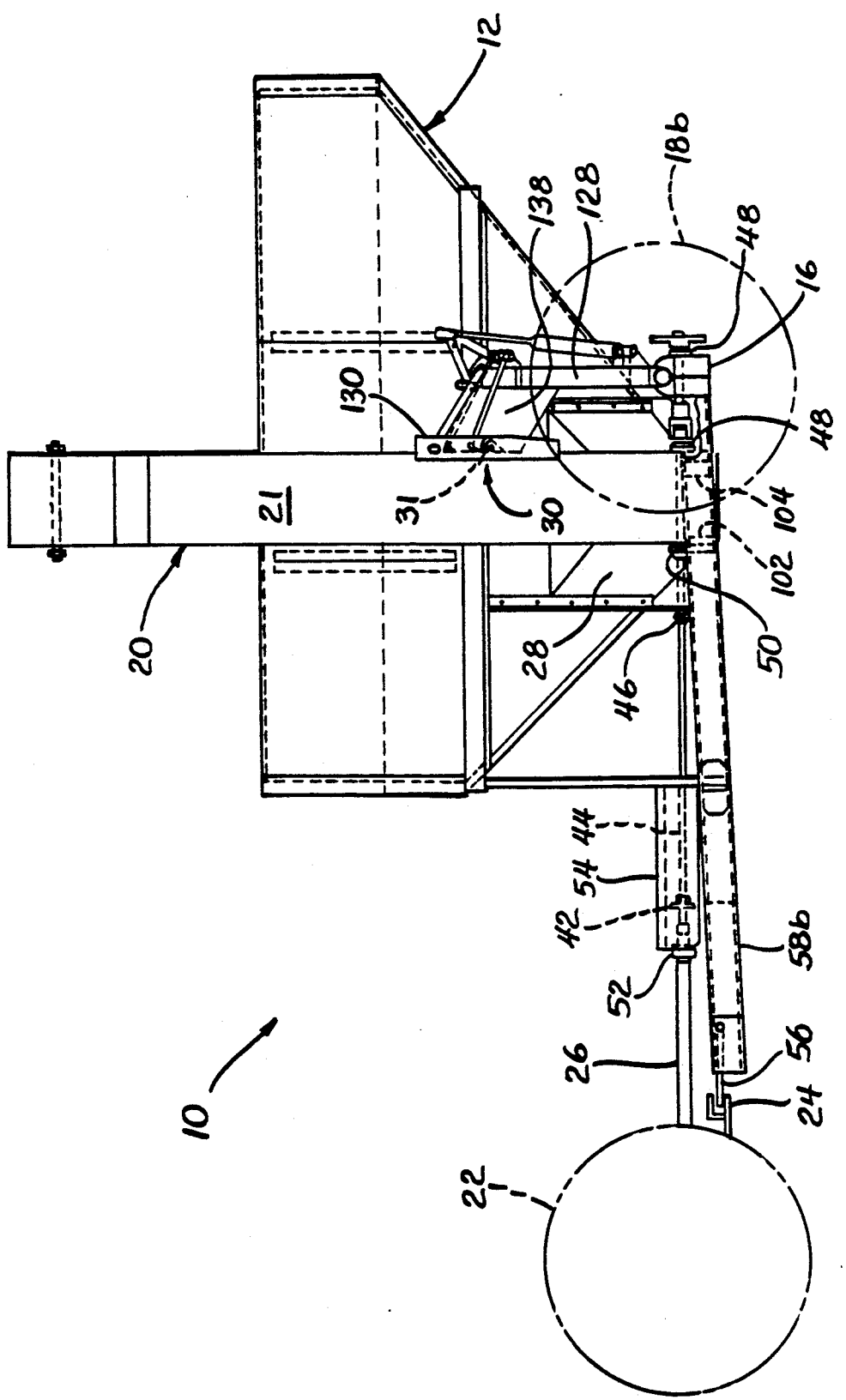
FIG. 1 is a side plan view shown partially in phantom of a grain cart incorporating a gravity fed, chain conveyor in accordance with the principles of the present invention.
Figure 2:
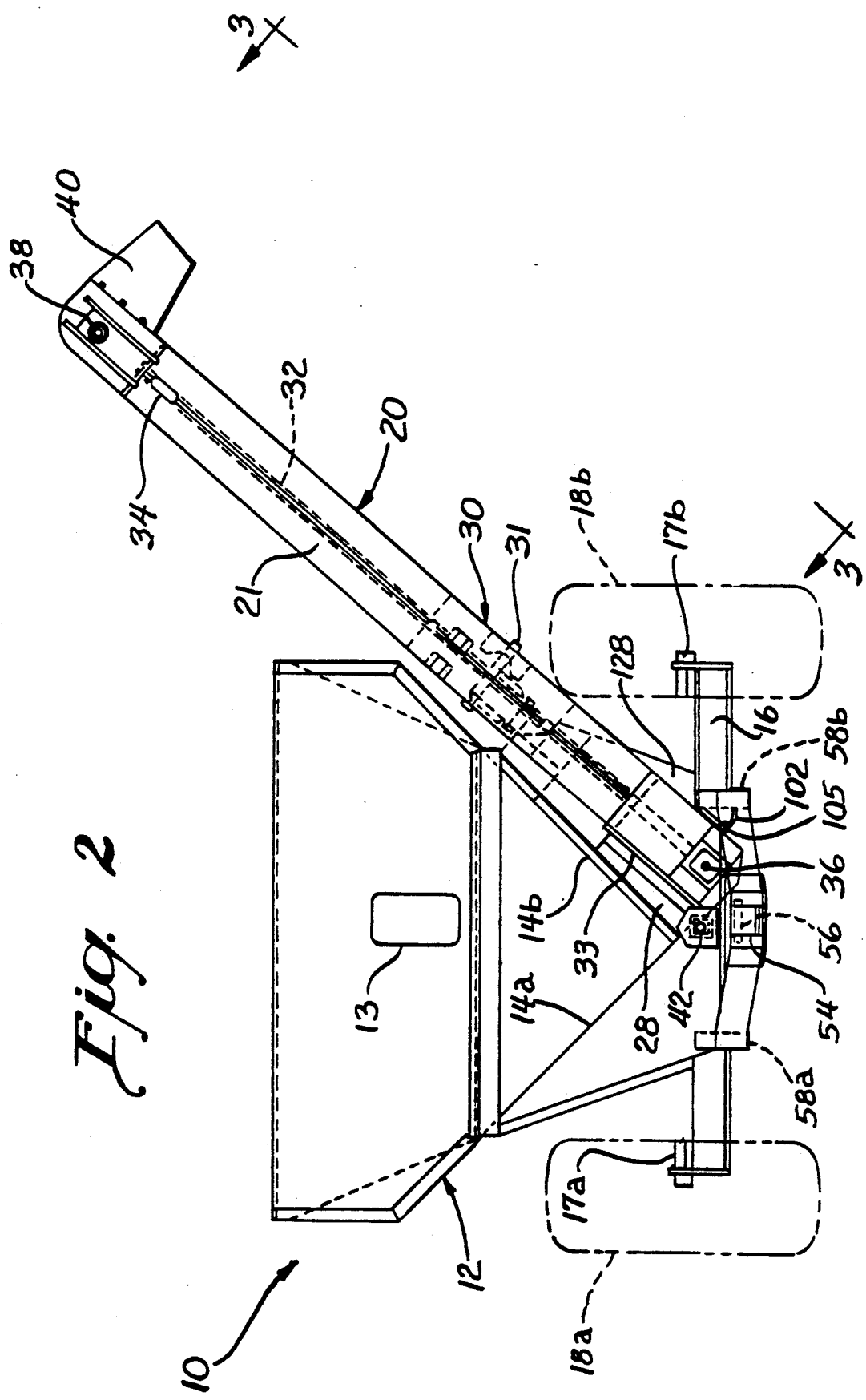
FIG. 2 is a front plan view shown partially in phantom of a grain cart with a gravity fed, chain conveyor in accordance with the present invention.

Referring to FIG. 1, there is shown a side plan view partially in phantom of a grain cart 10 with a gravity fed, unloading conveyor 20 in accordance with the principles of the present invention. FIG. 2 is a front plan view of the grain cart 10 of FIG. 1.

The grain cart 10 includes a gravity hopper-shaped box, or body, 12 having a plurality of sidewalls which define an open upper portion of the cart box 12. A lower portion of the cart box 12 is provided with facing wagon tub sides 14a, 14b which are angled inwardly toward one another so as to form a funnel-shaped discharge chute 28 in a lower portion of the gravity hopper-shaped box having a discharge aperture 33 therein. The grain cart body 12 is preferably comprised of high strength sheet metal sections joined together by conventional means such as weldments, rivets, or bolts.

Disposed generally beneath the gravity hopper-shaped box 12 and providing support therefore are various structural members in the form of steel box beams or I-beams. Thus, first and second frame members 58a and 58b extend from a forward portion of the grain cart 10 rearward in a flared manner. Forward portions of each of the frame member 58a and 58b are thus disposed adjacent one another and extend outwardly, followed by aft portions of each of these frame members extending straight back. Coupled to adjacent forward portions of the first and second frame members 58a, 58b is a hitch coupler 56 which is adapted for coupling in a conventional manner to a tractor hitch 24. The tractor to which the grain cart 10 is coupled is not shown for simplicity, although a tractor tire 22 is shown in dotted line form to illustrate the relative positions of the grain cart and the tractor.

Extending rearward from the tractor in a conventional manner is a power take-off (PTO) shaft 26. The PTO shaft 26 is rotationally displaced by the tractor's power plant, i.e., diesel engine, for driving the conveyor of the present invention as described below. The PTO shaft 26 is coupled to a solid shaft 44 by means of a PTO coupling 52. A forward portion of the solid shaft 44 is disposed within a forward housing 54 of the grain cart 10. A bearing 42 disposed about the solid shaft 44 facilitates its rotational displacement within the forward housing 54.

An aft portion of the solid shaft 44 extends adjacent to a lower portion of the gravity hopper-shaped box 12, with forward and aft support bearings 42 and 48 as well as an intermediate bearing 46 providing support for the solid drive shaft. Rotation of the PTO shaft 26 and the solid shaft 44 coupled thereto drives the paddle-type conveyor 20 of the present invention in removing, or off-loading, grain from the grain cart 10. Also coupled to a lower portion of the gravity hopper-shaped box 12 is an axle 16 in the form of a steel I-beam having first and second axle pins 17a and 17b disposed on respective ends thereof. A first wheel 18a is adapted for coupling to and positioning upon the first axle pin 17a, while a second wheel 18b is rotationally coupled to the second axle pin 17b.

Pivotally coupled to a lateral portion of the grain cart 10 by means of a conveyor hinge assembly 30 is the conveyor 20 which includes an elongated, linear, hollow housing 21 of unitary construction. The conveyor housing 21 includes a first inlet aperture 21a adapted for positioning over the discharge aperture 33 in a lower portion of the gravity hopper-shaped box 12 when the conveyor is in an upright position as shown in FIGS. 1 and 2. An upper end of the conveyor housing 21 includes a second outlet aperture 21b as well as a discharge spout 40 disposed adjacent thereto. The conveyor 20 includes a plurality of spaced, linearly movable paddles (not shown in FIGS. 1 and 2 for simplicity) as described in detail below. Windows 13 are disposed in an upper portion of the gravity hopper-shaped box 12 to permit rear viewing.

Figure 3:
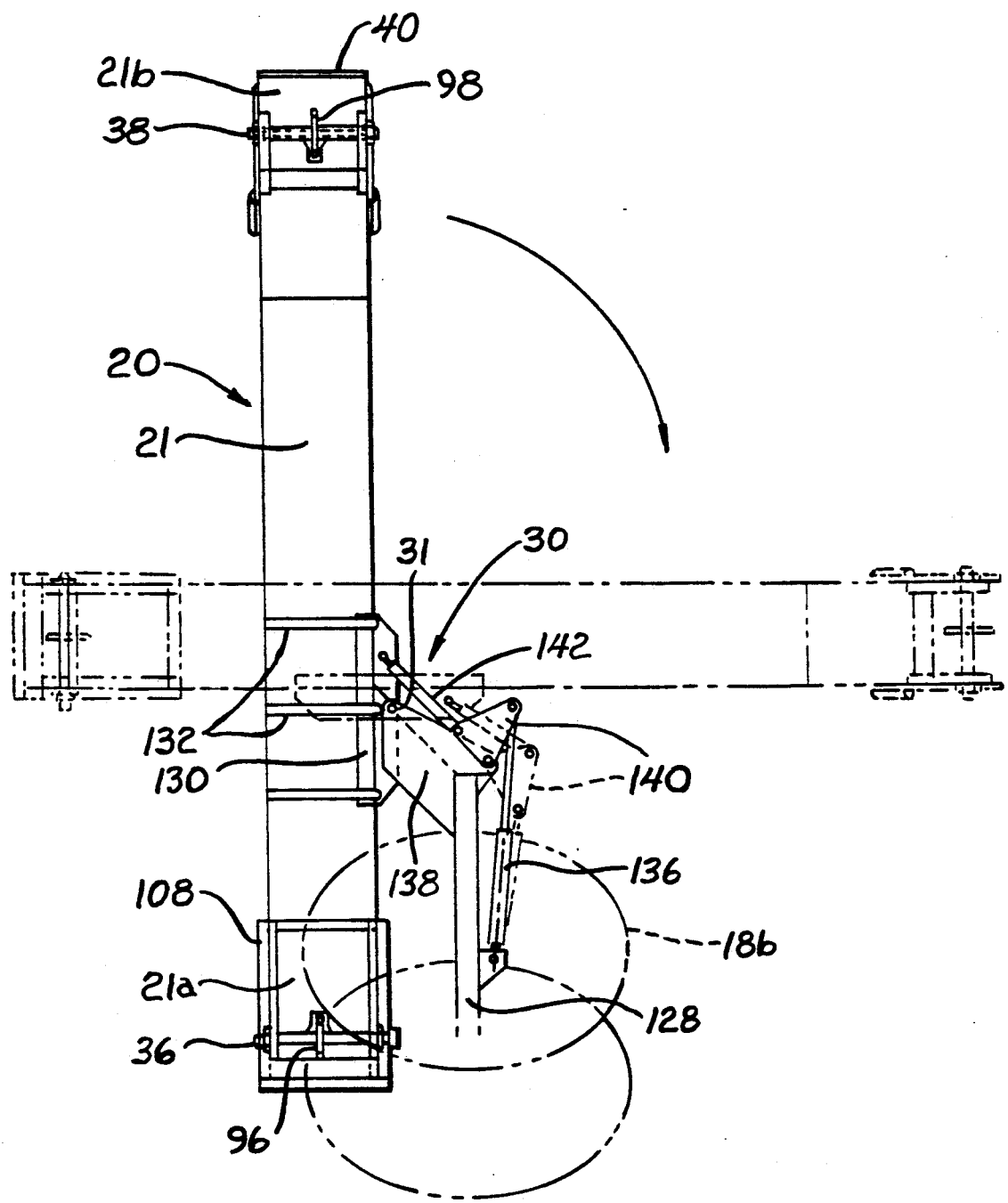
FIG. 3 is a plan view of the paddle-type, chain-driven conveyor shown in FIG. 2 taken along site line 3—3 therein.
Figure 4:
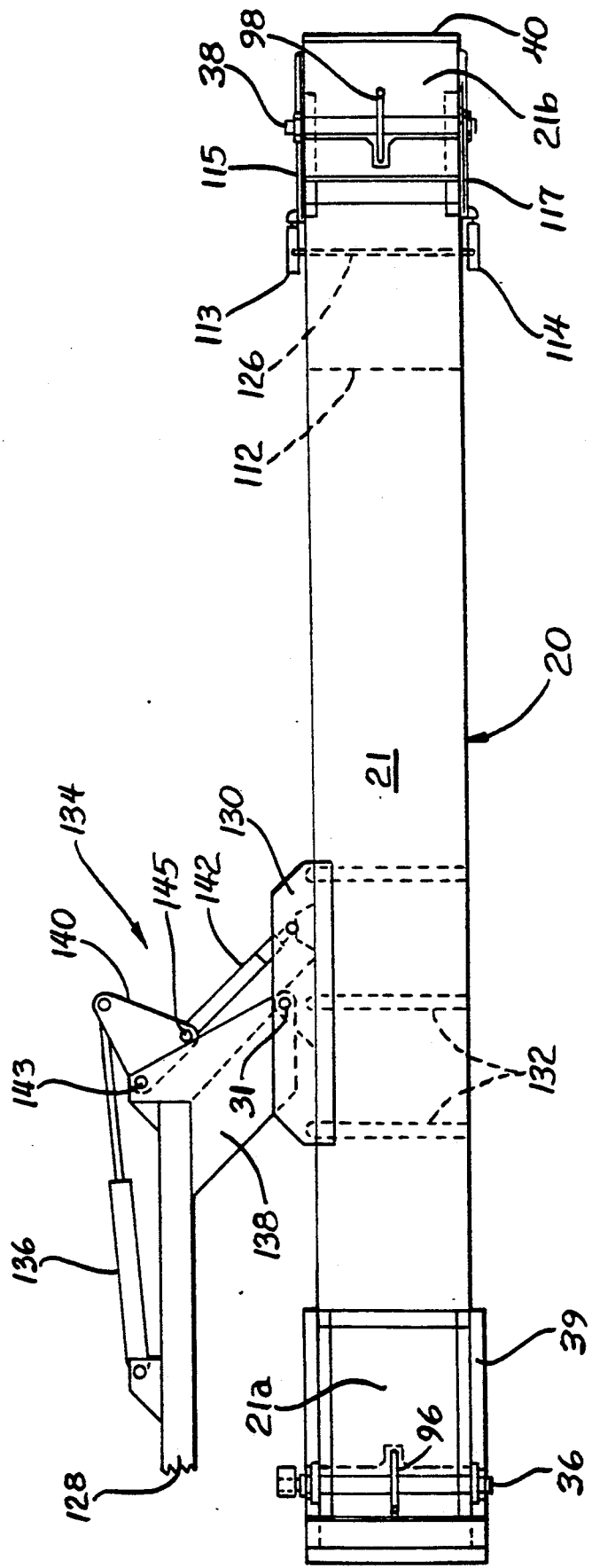
FIG. 4 is a side view shown partially in phantom of the paddle-type conveyor illustrating details of its attachment to a grain cart.

Referring also now to FIGS. 3 and 4, which are plan views showing additional details of the conveyor 20, the mounting and positioning of the conveyor on the grain cart 10 will now be described in detail. Attached to an intermediate portion of the conveyor housing 21 by conventional means such as weldments or bolts is a mounting bracket 130. The conveyor housing 21 may be provided with a plurality of structural reinforcing members 132 adjacent to where it is coupled to the mounting bracket 130. Mounting bracket 130 is attached to a wagon mounting bracket 138 by means of a pivot pin 31. The wagon mounting bracket 138 is rigidly coupled to and supported by a wagon side stake 128 mounted to and extending from axle beam 16. Thus, conveyor 20 is supported from directly above the grain cart axle 16. Pivoting displacement of the conveyor 20 is controlled by a conveyor fold hydraulic cylinder 136 as described in detail below. A butt end of the conveyor fold cylinder 136 is coupled to the wagon side stake 128 while the rod end of the cylinder is pivotally coupled to a pair of spaced, triangular coupling plates 140. The triangular coupling plates 140 are also pivotally coupled to the wagon mounting bracket 138 as well as to a first end of a rigid shaft coupler 142. A second end of the shaft coupler 142 is pivotally coupled to the conveyor mounting bracket 130.

FIG. 3 is a lower plan view of the conveyor 20 in the upright position as shown in FIG. 2 taken along site line 3—3 therein, while FIG. 4 is a side view of the conveyor assembly opposite to that shown in FIG. 3. Operation of the conveyor displacement arrangement will now be described as particularly shown in FIG. 3. With the conveyor fold cylinder 136 extended as shown in solid line form, the conveyor 20 is oriented in the upright position for off-loading grain from the grain cart. Retraction of the ram in the conveyor fold cylinder 136 causes rightward displacement of the triangular coupling plates 140 and shaft coupler 142 so as to pivotally displace the conveyor 20 about pivot pin 31 in a clockwise direction with reference in particular FIG. 3. Continued retraction of the conveyor fold cylinder's ram results in a 90° rotational displacement of the conveyor 20 as shown in dotted line form in FIG. 3. Rotational displacement of the conveyor 20 about the pivot pin 31 in the conveyor hinge assembly 30 as shown in FIG. 2 causes the conveyor housing 21 to assume a generally horizontal orientation adjacent to a lateral portion of the gravity hopper-shaped box 12. Thus, in the non-use position for storage or transport the conveyor 20 extends generally perpendicular to the plane of FIG. 2. The conveyor fold cylinder 136 is a double-acting hydraulic cylinder coupled to a hydraulic control system as described in detail below.

As shown in FIG. 4, the coupling plates 140 are pivotally coupled to the wagon mounting bracket 138 at pivot point 143 and to the shaft coupler 142 at pivot point 145. As shown in the figure, with hydraulic cylinder 136 fully extended and the conveyor 20 in an upright position the two pivot points 143 and 145 are aligned with the shaft coupler 142 to provide an over-center locking arrangement for the conveyor. In order to retract the conveyor 20, a positive force must be applied by the hydraulic cylinder 136 to move the conveyor from this over-center, locked position.

Rotationally coupled to a first end of the conveyor housing 21 is a drive sprocket 96. The drive sprocket 96 is mounted to a conveyor drive shaft 36 rotationally coupled to the conveyor housing 21 adjacent to the inlet aperture 21a therein. Disposed about the inlet aperture 21a on the conveyor housing 21 is an adjustable seal frame 108. The adjustable seal frame 108 is positioned in tight fitting contact with a lower portion of the gravity hopper-shaped box 12 to form a seal therewith in preventing grain leakage during grain off-loading. Disposed adjacent to a second end of the conveyor housing 21 is the combination of an idler shaft 38 and idler sprocket 98. A chain and paddle combination (not shown for simplicity) is disposed about the drive and idler sprockets 96 and 98 for moving grain deposited in the conveyor inlet aperture 21a in a first end of the housing 21 to a second end of the housing which includes an outlet aperture 21b. Disposed about the outlet aperture 21b is a discharge spout 40 for directing the transported and discharged grain into a truck, or other vehicle, for transport and/or storage. The conveyor drive shaft 36 is coupled to a conveyor drive system when the conveyor is in the upright, use position as described in detail in the following paragraphs.

Referring also to FIGS. 5 through 8, additional details of the conveyor 20 will now be described. FIG. 5 is a longitudinal sectional view of the conveyor 20, while FIGS. 6, 7 and 8 are sectional views of the conveyor shown in FIG. 5 respectively taken along site lines 6, 7 and 8 therein.

As previously described, the conveyor 20 includes a drive sprocket 96 attached to a conveyor drive shaft 36 adjacent to a first end of the conveyor housing 21 and the combination of an idler shaft 38 and idler sprocket 98 coupled to a second end of the conveyor housing. Disposed in the first end of the conveyor housing 21 is the inlet aperture 21a about which is disposed the adjustable sealing flange 108. The adjustable sealing flange 108 is attaached to an outer portion of the funnel-shaped discharge chute 28 and aligned with and disposed over a discharge aperture in a lower, tapered portion of the gravity hopper-shaped box 12. The lower portion of the gravity hopper-shaped box 12 includes a funnel-shaped discharge chute 28, as shown in FIGS. 1 and 2, leading into the first end of the conveyor housing 21. An access door shown as element 92a in the open position and as element 92b in the closed position is movably mounted to an inner portion of the gravity hopper-shaped box 12 and is coupled to a door control hydraulic cylinder 90. Extension of the door cylinder 90 causes the access door to move to the closed position as shown at 92b, while retraction of the door cylinder causes the access door to move to the open position as shown at 92a to permit grain to pass through the funnel-shaped discharge chute 28 and into the first end of the conveyor housing 21. Extension and retraction of the door cylinder 90 is controlled by a hydraulic system to which the cylinder is coupled as described in detail below.

An endless chain 32 having a plurality of paddles 110 coupled thereto in a spaced manner along the length thereof is coupled to the drive and idler sprockets 96 and 98. The chain 32 and attached paddles 110 are displaced in a clockwise direction by the drive sprocket 96 as viewed in FIG. 5 for displacing the grain rightward for discharge from the outlet aperture 21b in the conveyor housing 21 and the discharge spout 40. As shown in the simplified sectional view of FIG. 8, the grain is displaced toward the discharge end of the conveyor housing 21 above a divider, or partition, 111 within the housing, while a chain and paddle return path is provided for within the housing below the divider.

Referring specifically to FIGS. 4, 5 and 7, details of a chain tensioning mechanism located adjacent to the second, discharge end of the conveyor housing 21 will now be described. The chain tensioning mechanism includes a pair of chain tensioning hydraulic cylinders 113 and 114 disposed on respective outer lateral portions of the conveyor housing 21 and coupled together by means of a cross-over hydraulic tube 126. The chain tension cylinders 114 are coupled to a hydraulic system as described in detail below for extension of the cylinders in maintaining the conveyor chain 32 in a stretched condition, or under tension. Each of the chain tension cylinders 114 includes an extendable ram coupled to the idler shaft 38 by means of a respective sliding plate 115 and 117. Each of the sliding plates 115, 117 is maintained in position by means of a pair of sliding plate guides 118 which allow each of the plates to be displaced linearly along the conveyor housing while remaining in contact therewith. Extension of the rams of the chain tension cylinders 113, 114 urges the idler shaft 38 away from the drive shaft 36 so as to stretch the drive chain 32 and maintain it under tension. A sliding divider 112 is disposed on the end of the center divider 111 to maintain isolation between the upper and lower runs of the chain and ensure displacement of the grain to the end of the conveyor housing 21 where it is discharged via the discharge spout 40. Each of the chain tension cylinders 113, 114 is preferably a single acting hydraulic cylinder which is actuated to the extended configuration each time the access door 92 is closed as described below. A check valve (not shown) installed in the hydraulic circuit prevents oil from leaving the chain tension cylinders 114 which are thereby prevented from retracting. A ratchet and pawl assembly 116 prevents a complete loss of chain tension should a cylinder, hydraulic line, or a check valve (described below) fail.

Referring to FIGS. 2 and 6, there are shown details of the manner in which the inlet end of the conveyor housing 21 is maintained in tightly sealed engagement with the outer surface of the funnel-shaped discharge chute 28 about the discharge aperature 33 therein. As the conveyor 20 is pivotally displaced about the conveyor hinge assembly 30 from the generally horizontal storage and transport position to an upright position for unloading the grain cart 10, a lower, outer portion of the conveyor housing 21 engages a pair of wedges 102 and 104 attached to a cart frame member, such as the second frame member 58b as shown in FIG. 2. The first and second wedges 102, 104 are also shown in dotted line form in FIG. 1. Each of the wedges 102, 104 includes an angled surface for engaging an outer portion of the conveyor housing 21 and urging the conveyor in tight fitting relation with an outer portion of the funnel-shaped discharge chute 28 in the lower hopper portion of the grain cart body. Disposed about the discharge aperture 33 and attached to the funnel-shaped discharge chute 28 is an adjustable metallic sealing flange 180 which is positioned over the inlet aperture 21a in the conveyor housing 21. The adjustable seal frame 108 includes a plurality of elongated, linear members coupled to the conveyor housing 21 by means of bolts to allow the seal frame members to be loosened and readjusted in position for tight fitting engagement with the funnel-shaped discharge chute 28.

Figure 9:
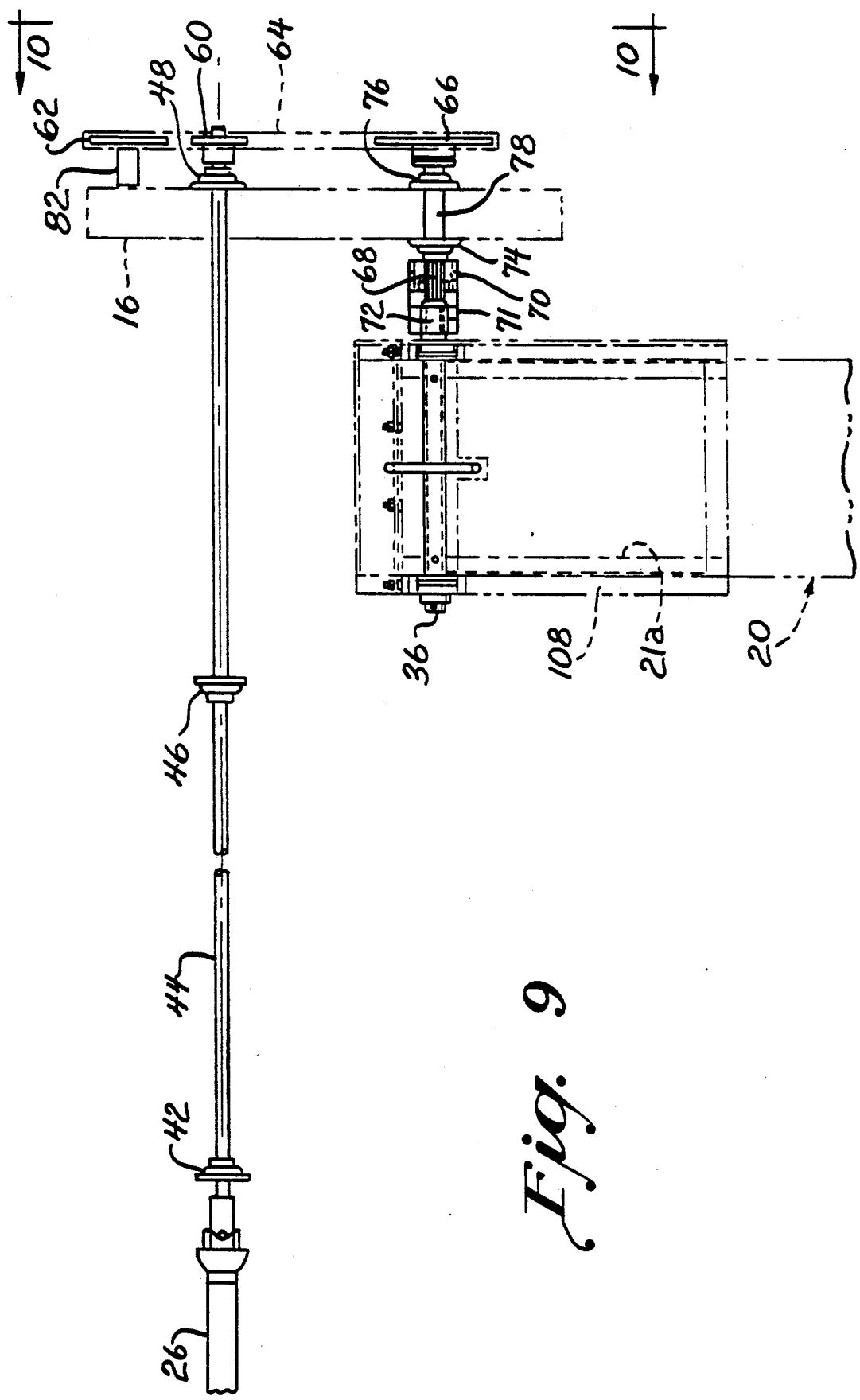
FIG. 9 is a plan view shown partially in phantom of a drive arrangement for coupling the paddle-type conveyor to a tractor PTO unit.
Figure 10:
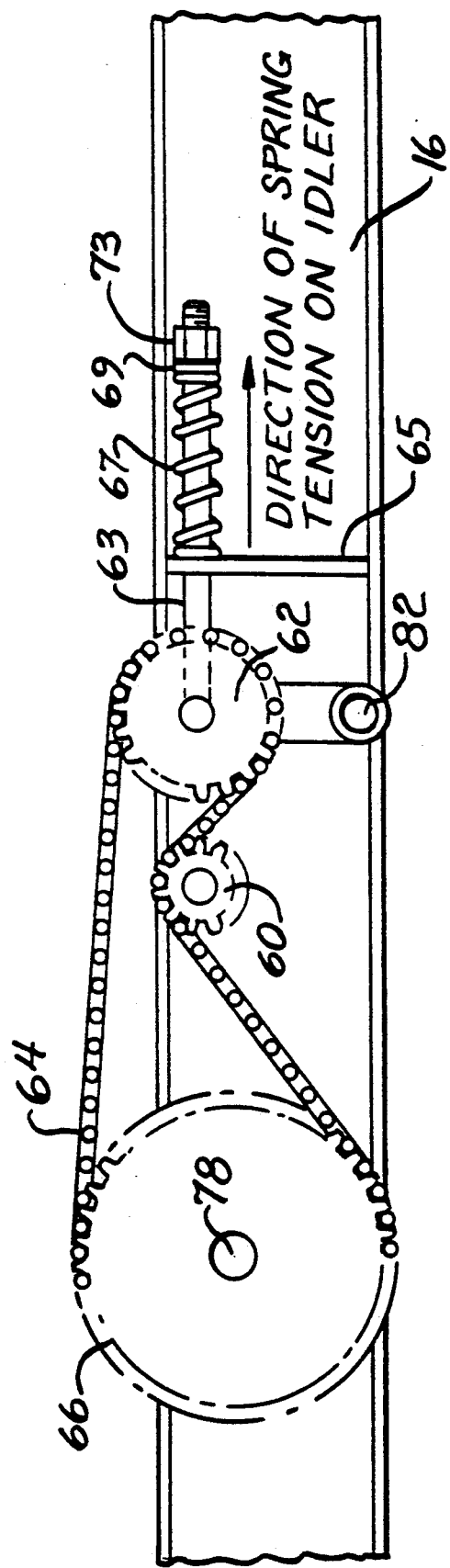
FIG. 10 is a simplified schematic diagram of the conveyor drive arrangement used in a preferred embodiment of the present invention.

Referring to FIGS. 9 and 10, there are shown details of a conveyor drive arrangement for use with the grain cart conveyor of the present invention. As previously described, a solid shaft 44 is coupled to a tractor PTO shaft 26 and extends adjacent to a lower portion of the grain cart as well as through the axle beam 16 as shown in dotted line form in FIG. 9. A pair of metal seals 46 and 48 disposed along the length of the solid shaft 44 in a spaced manner permit the shaft to extend through a lower portion of the grain cart body while preventing leakage of grain therefrom. The solid shaft 44 is coupled to a drive sprocket 60 about which is disposed an endless chain 64. The endless chain 64 is also disposed about a driven sprocket 66 which is positioned upon a driven sprocket shaft 78. The endless chain 66 is also wound around a movable idler sprocket 62. The idler sprocket 62 is rotationally coupled to a draw bolt 63 inserted through an aperture in a spring anchor bar 65 fixedly attached to the axle beam 16 such as by weldments. Disposed about the shaft 63 is a compression spring 67. Attached to a distal end of the shaft 63 is a nut 73, with a washer 69 disposed between the nut and one end of the compression spring 67. The other end of the compression spring 67 is positioned in abutting contact with the spring anchor bar 65. The compression spring 67 urges the draw bolt 63 and idler sprocket 62 in the direction of the arrow in FIG. 10 so as to maintain the chain 64 tightly stretched about the drive, driven and idler sprockets 60, 66 and 62. Increased tension may be applied to the chain 64 by tightening of the nut 73 on the draw bolt 63 so as to further compress spring 67. An idler pivot 82 is pivotally coupled to the axle beam 16 as well as to the idler sprocket 62 for attaching the idler sprocket to the axle beam while allowing for limited movement of the idler sprocket as previously described for maintaining the chain 64 in a tightly stretched condition. It should be noted that some of the details of the positioning and support structure for the idler sprocket 62 have been omitted from FIG. 9 for the sake of simplicity.

As shown in FIG. 9, the driven sprocket shaft 78 is coupled to a spline shaft 68. Bearings 74 and 76 disposed on facing surfaces of the axle beam 16 facilitate rotation of the driven sprocket shaft 78. Attached to a distal end of the spline shaft 68 is a female coupler 71 which is urged away from the axle beam 16 by means of a spring 70 disposed about the spline shaft 68. The female coupler 71 is adapted for tight fitting engagement with a male coupler 72 attached to an end of the conveyor drive shaft 36. The female and male couplers 71, 72 have a complementary, interfitting configuration so as to rotate the conveyor drive shaft 36 when the driven sprocket shaft 78 is rotationally displaced. If the lugs on the female and male couplers 71 and 72 are out of position when the conveyor assembly is swung into position as shown in FIG. 9, spring 70 allows the female coupler 71 to back away and then return to its normal position in secure engagement with the male coupler 72 when power is applied.

Figure 11:
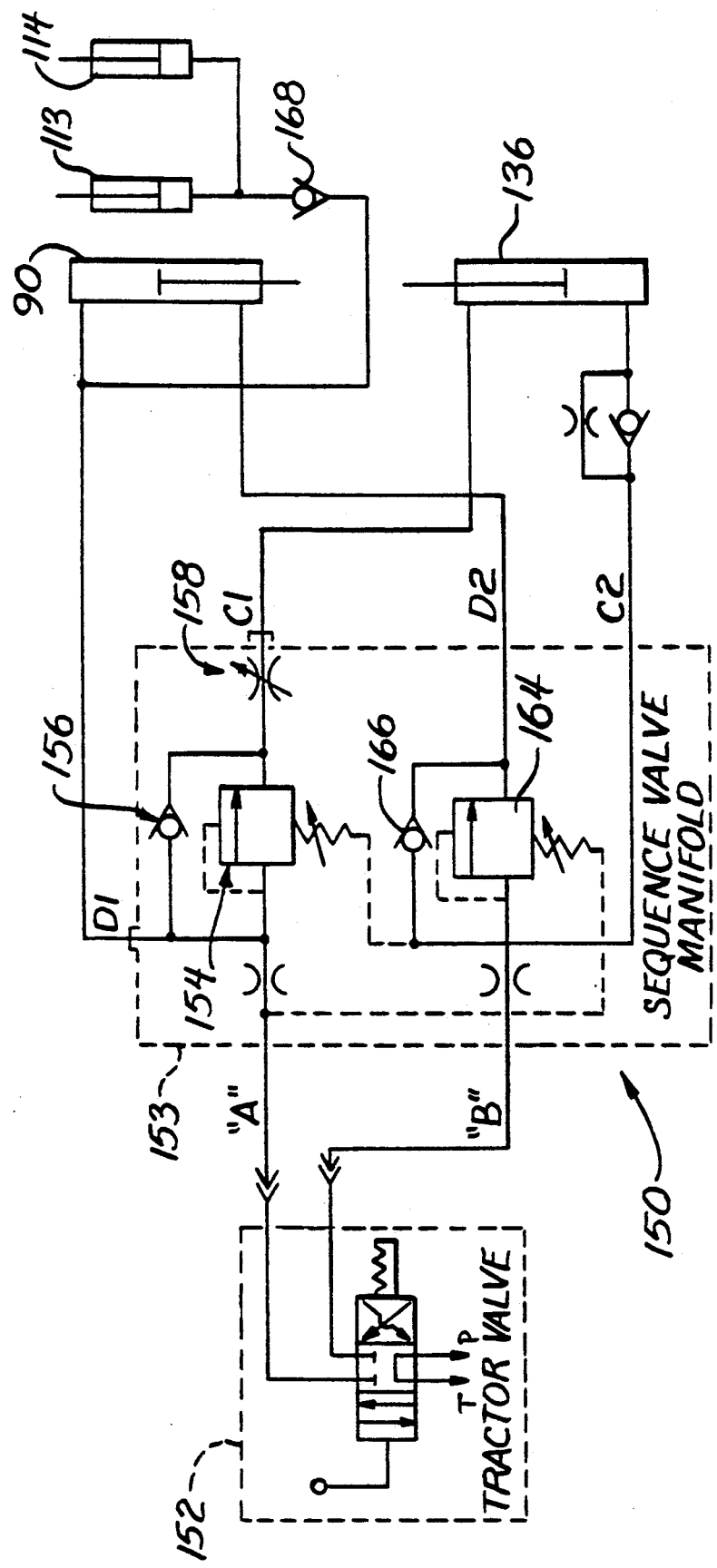
FIG. 11 is a simplified schematic diagram of the hydraulic system used in a preferred embodiment of the present invention.

Referring to FIG. 11, there is shown a simplified schematic diagram of a hydraulic control system 150 for use with the grain cart conveyor of the present invention. The hydraulic control system 150 includes a tractor valve 152 coupled to a tractor hydraulic system via lines "A" and "B". The hydraulic control system 150 further includes a sequence valve manifold 153 including first and second sequence valves 154 and 164 and first and second check valves 156 and 166. The hydraulic control system 150 is coupled to the access door cylinder 90 for opening and closing the access door as well as to the conveyor fold cylinder 136 for moving the conveyor between the upright use position and the generally horizontal non-use position. The hydraulic control system 150 is further coupled to the first and second chain tensioning cylinders 113 and 114. The sequence valve manifold 153 is coupled to the tractor valve 152 via the "A" and "B" lines. Pressurization of line "A" causes extension of the door cylinder 90 and closure of the access door. Pressurization of line "A" also causes retraction of the conveyor fold cylinder 136 causing the conveyor to assume the generally horizontal non-use position. The closure of valve 158 locks the conveyor fold cylinder 136 in any given position. The door cylinder 90 retracts when the tractor valve 152 is activated and the pressure in line "B" exceeds the sequence valve setting. Pressurization of line "B" causes the door cylinder 90 to retract, moving the access door away from the access aperture in the funnel-shaped discharge chute. Pressurization of line "B" also causes extension of the conveyor fold cylinder 136 causing the conveyor to be pivotally displaced to the upright position for off-loading the grain. Every time the door cylinder 90 extends so as to close the access door, pressure is applied to the pair of chain tension cylinders 113 and 114 for appying the proper tension to the conveyor chain. Check valve 168 prevents retraction of cylinders 113 and 114 and loss of chain tension. The arrangement of sequence and check valves in the hydraulic control system 150 prevents retraction of the door cylinder 90 and opening of the access door prior to full extension of the conveyor fold cylinder 136 and upright positioning of the conveyor so as to prevent grain leakage and loss.

Figure 12:
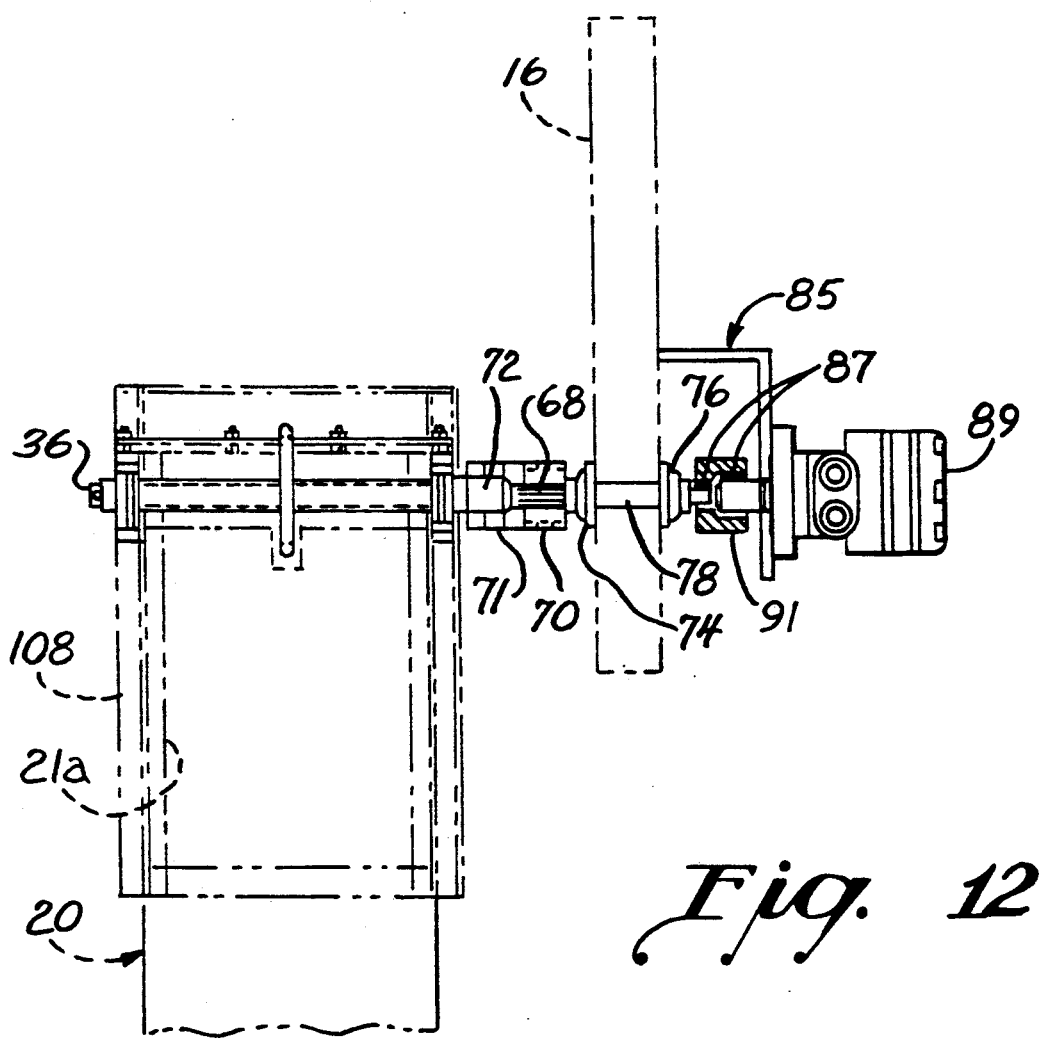
FIG. 12 is a simplified schematic diagram of a conveyor drive arrangement employing a hydraulic motor in accordance with another aspect of the present invention.

Referring to FIG. 12, there is shown a simplified schematic diagram of a conveyor drive arrangement employing a hydraulic motor 89 in accordance with another aspect of the present invention. FIG. 12 is similar to FIG. 9 in that similar elements are identified by the same number in both figures. While FIG. 9 shows a conveyor 20 coupled to and driven by the tractor's PTO unit, in FIG. 12 the conveyor is driven by the hydraulic motor 89. The hydraulic motor is attached to the axle beam 16 by means of a mounting bracket and is coupled to the sprocket shaft 78 by means of the combination of an adapting coupler 91 and a pair of drive keys 87.

There has thus been shown a gravity fed, paddle-type chain conveyor for use in off-loading a grain cart. A lower portion of the grain cart body is provided with a downwardly tapered hopper section with a discharge aperture and a hydraulically controlled, sliding access door. A conveyor assembly movable between a generally horizontal position for storage or transport and an upright position for grain off-loading under control of a hydraulic cylinder is adapted for off-loading grain discharged under gravity from the discharge aperture. The conveyor includes an elongated, linear, hollow housing containing a pair of sprockets and a drive chain to which are attached in a spaced manner a plurality of paddles. Grain falling into a first, inlet end of the conveyor housing is moved by the paddles to a second, discharge end of the conveyor housing for off-loading. Drive means is provided for coupling the paddle-type conveyor to a tractor PTO shaft and the access door and conveyor fold cylinders are adapted for coupling to and operation by the tractor's hydraulic system. The conveyor's inlet end is wedged into tight-fitting engagement with the funnel-shaped discharge chute to prevent grain loss, while automatic conveyor chain tensioning is provided by hydraulics near its second discharge end.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A grain cart adapted for pulling by a tractor having a power take-off (PTO) unit, said grain cart comprising: a body having a plurality of side walls defining an open upper portion for receiving and holding grain and a lower, laterally tapered hopper portion having a side discharge aperture; a plurality of wheels coupled to said body to facilitate transport of said body; conveyor means having an elongated, unitary housing with an open inlet end and an open outlet end and a plurality of spaced movable paddles for transporting grain from said inlet end to said outlet end; mounting means for pivotally attaching said conveyor means to an outer, lateral portion of said body; positioning means coupled to said mounting means for pivotally displacing said conveyor means between a generally horizontal transport position and an upright use position wherein grain enters the inlet end of said conveyor means under gravity from the hopper discharge aperture; means for sealingly coupling said inlet end of said conveyor means to said discharge aperture of said body when said positioning means places said conveyor means in said use position; and drive means coupled to said conveyor means for transporting grain from said inlet end to said outlet end of said conveyor means for discharge therefrom.

2. The grain cart of claim 1 further comprising disengageable coupling means for connecting said conveyor means to said drive means when in the upright position and for disconnecting said conveyor means when moved to the transport position.

3. The grain cart of claim 2 wherein said disengageable coupling means includes first and second complementary shaft-mounted couplers respectively connected to said conveyor means and to said drive means.

4. The grain cart of claim 3 further comprising biasing means for urging said first and second complementary couplers into intimate engagement when said conveyor means is in the upright position.

5. The grain cart of claim 4 wherein said complementary couplers comprise a spline arrangement and said biasing means includes a spring.

6. The grain cart of claim 5 wherein said drive means includes a rotating shaft coupled to the tractor PTO unit and said conveyor means include a drive shaft coupled to said rotating shaft by means of said disengageable coupling means.

7. The grain cart of claim 6 wherein said conveyor means further includes a sprocket and endless chain arrangement with said paddles attached to said endless chain along the length thereof in a spaced manner.

8. The grain cart of claim 7 wherein said conveyor means further includes a drive sprocket connected to said drive shaft and an idler sprocket, and wherein said endless chain couples said drive and idler sprockets.

9. The grain cart of claim 8 further comprising chain tensioning means for maintaining said endless chain under tension.

10. The grain cart of claim 9 wherein said chain tensioning means includes at least one hydraulic cylinder coupled to said idler sprocket for urging said idler sprocket away from said drive sprocket.

11. The grain cart of claim 10 wherein said drive sprocket is disposed adjacent to the inlet end of said conveyor housing and said idler sprocket is disposed adjacent to the outlet end of said conveyor housing.

12. The grain cart of claim 1 further comprising closure means for covering the discharge aperture when said conveyor means is in the transport position.

13. The grain cart of claim 12 wherein said closure means includes a hydraulically actuated door.

14. The grain cart of claim 13 further comprising means for closing said door when said conveyor housing is moved to the transport position while allowing said door to be opened under control of an operator.

15. The grain cart of claim 1 wherein said conveyor means further includes a sprocket and endless chain arrangement with said paddles attached to said endless chain in a spaced manner along the length thereof.

16. The grain cart of claim 1 further comprising means for urging the inlet end of said conveyor housing in tight-fitting engagement with the hopper portion of said grain cart body adjacent to the discharge aperture therein.

17. The grain cart of claim 16 wherein said means for urging includes at least one wedge-shaped member for engaging and urging the inlet end of said conveyor housing toward the hopper portion of said grain cart body.

18. The grain cart of claim 17 further comprising seal means disposed between the inlet end of said conveyor housing and the hopper portion of said grain cart body.

19. The grain cart of claim 18 wherein said seal means includes a metal-to-metal seal between said conveyor housing and said hopper portion of the grain cart body.

20. A folding mechanism for a conveyor on a grain cart for moving said conveyor between a non-use position for transport or storage and a use position for off-loading grain from said cart, wherein said conveyor includes an elongated housing having an inlet end and an outlet end and said cart includes a body having at least a pair of opposed, inclined side walls and a discharge aperture in one of said inclined side walls, and wherein said conveyor further includes a plurality of spaced moveable paddle means for transporting grain from said inlet end to said outlet end, said folding mechanism comprising: attachment means for pivotally coupling an intermediate portion of the conveyor housing to the cart body for pivoting about an axis perpendicular to said one inclined side wall and above said discharge aperture, said attachment means allowing the conveyor to move between a generally horizontal non-use position for storage or transport and an upright use position, wherein the inlet end of the conveyor housing is positioned in tight-fitting, sealing engagement with the discharge aperture in said one inclined side wall of said cart body, for receiving grain from the cart body under gravity for transport to and discharge from the outlet end of the conveyor and wherein said housing is of unitary structure; and displacement means coupled to said attachment means for pivotally moving said attachment means and the conveyor housing attached thereto between said non-use and use positions.

21. The folding mechanism of claim 20 wherein said attachment means includes first and second mounting brackets fixedly attached to the conveyor housing and to the grain cart body, respectively, and a hinge pin pivotally coupling said first and second mounting bracket.

22. The folding mechanism of claim 21 wherein said second mounting bracket is in vertical alignment with an axle of the grain cart.

23. The folding mechanism of claim 21 further comprising pivoting linkage coupling said displacement means to said attachment means.

24. The folding mechanism of claim 23 wherein said displacement means includes a hydraulic cylinder coupled to said pivoting linkage for displacing said first mounting bracket and said conveyor housing coupled thereto between the use and non-use positions.

25. The folding mechanism of claim 24 wherein said pivoting linkage assumes an overcenter configuration for locking the conveyor in the upright use position.

26. The folding mechanism of claim 24 wherein the grain cart is adapted for pulling by a tractor having a hydraulic system and wherein said hydraulic cylinder is coupled to the tractor's hydraulic system.

27. The folding mechanism of claim 20 further comprising means for urging the lower open portion of said conveyor housing into intimate contact with the grain cart body adjacent to the discharge aperture therein.

28. The folding mechanism of claim 27 wherein said means for urging includes at least one wedge pad disposed intermediate the lower open portion of the conveyor housing and the grain cart to ensure intimate contact between the conveyor housing and the discharge aperture to prevent grain spillage.

29. A conveyor in combination with a grain cart for off-loading grain from the cart, wherein said cart includes a body with a discharge aperture in a lower, lateral, tapered portion thereof, said conveyor comprising: an elongated, linear housing of unitary structure having open inlet and outlet apertures at respective ends thereof; displacement means disposed within said housing and including a plurality of spaced paddles for moving grain deposited in the inlet aperture to the outlet aperture of said housing for discharge therefrom; positioning means coupling said housing to the cart body for pivotally displacing said housing between a generally horizontal non-use position for storage or transport and an upright position for off-loading grain from the cart, wherein the inlet aperture is disposed in tight-fitting, sealing registration with said discharge aperture when said housing is in said upright position to permit grain to enter the inlet aperture of said housing under the influence of gravity and without loss; and drive means coupled to said displacement means when said housing is in the upright position for displacing said paddles in moving and off-loading the grain, and wherein said displacement means is disconnected from said drive means when said housing is moved to the non-use position.

30. The conveyor of claim 29 wherein said displacement means further includes a movable endless chain coupled to said paddles.

31. The conveyor of claim 30 wherein said displacement means further includes drive and idler sprockets coupled to said endless chain, and wherein said drive sprocket is coupled to said drive means.

32. The conveyor of claim 31 wherein said drive sprocket is disposed adjacent to the inlet aperture of said conveyor housing and said idler sprocket is disposed adjacent to the outlet aperture of said conveyor housing.

33. The conveyor of claim 31 further comprising chain tensioning means for maintaining said endless chain under tension.

34. The conveyor of claim 33 wherein said chain tensioning means includes hydraulic cylinder means coupled to said idler sprocket for urging said idler sprocket away from said drive sprocket in stretching said chain and maintaining it taut.

35. The conveyor of claim 29 wherein each of said paddles is comprised of plastic.

36. The conveyor of claim 29 wherein said conveyor housing includes an upper grain flow channel and a lower paddle return channel extending along the length thereof.

37. The conveyor of claim 29 further comprising quick disconnect, automatic coupling means for connecting said displacement and drive means when said conveyor housing is moved to the upright position.

38. The conveyor of claim 37 wherein said displacement and drive means each include respective drive shafts which are in mutual alignment when said conveyor housing is in the upright position.

39. The conveyor of claim 38 wherein said quick disconnect, automatic coupling means includes complementary, interconnecting couplers attached to the drive shafts of each of said displacement and drive means.

40. The conveyor of claim 39 further comprising biasing means for urging said complementary, interconnecting couplers in mutual engagement.

41. The conveyor of claim 40 wherein said complementary, interconnecting couplers form a spline arrangement and said biasing means includes a spring.

42. The conveyor of claim 29 wherein the grain cart is adapted for pulling by a tractor having a power take-off (PTO) unit and wherein said drive means is coupled to the tractor's PTO unit.

43. The conveyor of claim 29 further comprising biasing means for urging a portion of said conveyor housing adjacent to the inlet aperture therein in tight-fitting engagement with the grain cart body about the discharge aperture therein in forming a seal therebetween.

44. The conveyor of claim 43 wherein said biasing means includes a wedge-shaped member mounted to the grain cart for engaging and urging said conveyor housing toward the grain cart body when moved to the upright position.

45. The conveyor of claim 29 wherein said positioning means includes a hydraulic cylinder for pivotally displacing said conveyor housing between the generally horizontal non-use and upright positions.

46. The conveyor of claim 29 wherein said drive means includes a hydraulic motor.

47. A grain cart adapted for pulling by a tractor, said grain cart comprising: a body having a plurality of side walls defining an open upper portion for receiving and holding grain and a lower, tapered hopper portion including a discharge aperture therein and at least an inclined wall extending upwards and outwardly from said discharge aperture for directing grain to flow toward said discharge aperture under gravity; ground-engaging support means coupled to said body for supporting and transporting said body; conveyor means having an elongated, unitary housing with an open inlet end and an open outlet end and including a plurality of spaced movable paddles for transporting grain from said inlet end to said outlet end; mounting means for pivotally attaching said conveyor means to an outer, lateral portion of the inclined wall of said body; positioning means coupled to said mounting means for pivotally displacing said conveyor means between a generally horizontal transport position, wherein said conveyor housing is positioned within the lateral limits of said ground engaging support means, and an upright use position wherein grain enters the inlet end of said conveyor housing under the influence of gravity from the hopper discharge aperture and wherein the outlet end of said conveyor housing extends beyond the lateral limits of said ground engaging support means and above the open upper portion of said body; and drive means coupled to said conveyor means for transporting grain from said inlet end to said outlet end of said conveyor means for discharge therefrom.

48. A grain cart adapted for pulling by a tractor having a power take-off (PTO) unit, said grain cart comprising: a body having inclined side walls for directing material disposed within said cart to a single discharge opening; a conveyor including a plurality of spaced movable paddles and having an inlet end and an outlet end; mounting means for pivotally coupling said conveyor to an inclined side wall of the grain cart for positioning said conveyor between a first use position, wherein said conveyor extends upwardly and outwardly and the inlet end of said conveyor is in registration with said discharge opening in the grain cart, and in a second, generally horizontal non-use position for storage and transport; control means coupled to said mounting means and responsive to the position of said conveyor for closing a sliding gate disposed to close said discharge opening when said conveyor is in said second non-use position and for opening said sliding gate when said conveyor is in said use position thereby permitting gravity discharge of the material from the grain cart into the inlet end of said conveyor; drive coupling means for connecting said conveyor to a drive source when said conveyor means is in said use position; said drive coupling means being constructed and arranged such that said discharge door is opened only after said conveyor is positioned in said use position and the inlet end of said conveyor is in sealing registration with said single discharge opening in the grain cart, and wherein said sliding gate is returned to the closed position before said conveyor is moved toward said non-use position to prevent spillage of material from the grain cart.

* * * * *